Patented Nov. 14, 1950

2,529,477

UNITED STATES PATENT OFFICE 2,529,477

PROCESS FOR THE MANUFACTURE OF PEANUT PROTEIN

Jett C. Arthur, Jr., New Orleans, La., assignor to the United States of America as represented by the Secretary of Agriculture No Drawing. Application May 3, 1949, Serial No. 91,209

5 Claims. (Cl. 260—123.5)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to me of any royalty thereon.

This invention relates to the isolation of protein from oil-free peanut meal or cake. It particularly concerns the treatment of the dispersed particles of peanut protein contained in alkaline extracts of peanut meal to form a dense and heavy protein curd which can be easily separated from the liquids used in isolating the protein from the peanut meal.

In the normal practice of isolating protein from peanut meal, the peanut meal is suspended in water and wetted by stirring the suspension. Then chemicals are added to the meal-water suspension to peptize the protein. The suspension is clarified to remove the insoluble portion of the meal; and then chemicals are added to precipitate the protein from the clarified solution. The protein curd is allowed to settle for several hours and is finally separated from the liquids by means of filtration and/or centrifugation.

One of the problems encountered in the preparation of peanut protein is the physical separation of the precipitated protein curd from the mother liquor. In the normal practice the protein curd is light and does not settle rapidly. This fact requires that practically the entire volume of the mother liquor be handled in order that a maximum yield of protein may be isolated. It is also a practice to allow the protein curd to settle for long periods of time, 10 to 14 hours, and then to isolate the protein curd from the liquor. This procedure is not entirely satisfactory for several reasons, namely, the curd does not concentrate to a great degree and enzymatic and hydrolytic reactions may degrade or denature the protein when it is allowed to remain in solution for a long period of time.

Methods for making dense soybean protein curds have been described in the technical literature. One of the processes for the preparation of dense soybean protein curds includes the heating of the liquor containing the soybean protein to a high temperature during the precipitation of the protein. Processes, such as the one mentioned, for making dense soybean protein curds, do not work when applied to peanut protein due to the fact that peanut, soybean, and other vegetable proteins differ greatly in their physical and chemical properties. When solutions containing peanut protein are heated to high temperatures during the precipitation of the protein, a light, fluffy protein curd is formed.

I have discovered that the density of a peanut protein curd can be controlled (1) by regulating the rate at which the protein is precipitated from an alkaline solution by means of sulfur dioxide and (2) by adjusting the temperature of the alkaline solution to a range between 70° to 90° F. My new process is described in a publication, "Pilot Plant Manufacture of Peanut Protein," The Journal of the American Oil Chemists' Society, vol. XXV, No. 11, pages 398–400, November 1948 issue. In said publication is set forth an improved process of isolating peanut protein from solvent-extracted meals, in which the yield of protein has been greatly increased and operations simplified.

The various steps employed in processing peanut meal for protein and by-products are: (1) preparation of a water-peanut meal suspension in the weight ratio of 10 parts of water to 1 part of meal; (2) addition of sodium hydroxide to the water-meal suspension until the pH of the suspension is adjusted to about 7.5, which is the optimum pH of peptization of the protein; (3) clarification of the mixture by screening, centrifuging and/or filtering to remove the insoluble portion of the meal; (4) washing of meal residue with a volume of water which increases the weight ratio to 15 parts of water to 1 part of meal, the optimum water-meal ratio for peanut protein preparation; (5) addition of gaseous sulfur dioxide to the clarified solution until the pH of the solution is about 4.5, the point at which the maximum amount of peanut protein precipitates; (6) isolation of the protein curd from the liquor by means of centrifugation or filtration.

The rate of addition of gaseous sulfur dioxide to the alkaline solution containing the protein or the rate of lowering of the pH of the alkaline solution containing the protein affects the type and density of protein curd formed. This rate of addition of sulfur dioxide was discovered to be critical in determining the density of the curd as shown in Table 1. The effect of the rate of addition of sulfur dioxide on the type and density of Table 1.—*Effect of rate of addition of sulfur dioxide on protein curds at 90° F.*

| Rate of addition of sulfur dioxide, lb./min./100 lb. meal | | | | | |
|---|---|---|---|---|---|
| 0.0729 | | 0.157 | | 0.230 | |
| Time | Solids in curds | Time | Solids in curds | Time | Solids in curds |
| Minutes | Per Cent | Minutes | Per Cent | Minutes | Per Cent |
| 0 | 3.35 | 0 | 3.26 | 0 | 3.26 |
| 15 | 3.51 | 13 | 3.53 | 14 | 5.93 |
| 18 | 3.56 | 34 | 4.53 | 17 | 7.56 |
| 34 | 4.17 | 82 | 8.68 | 20 | 8.71 |
| 49 | 4.82 | 136 | 11.09 | 26 | 10.11 |
| 70 | 6.30 | 157 | 11.51 | 31 | 10.95 |
| 79 | 6.76 | 192 | 12.53 | 43 | 12.63 |
| 91 | 7.20 | 268 | 14.09 | 63 | 14.73 |
| 120 | 8.13 | | | 113 | 18.11 |
| 137 | 8.55 | | | 157 | 20.40 |
| 158 | 9.09 | | | 198 | 22.50 |
| 175 | 9.42 | | | 223 | 22.82 |
| 225 | 10.48 | | | 229 | 23.71 | the protein curds is shown as a function of the rate of settling of the curd, this function being directly proportional to density of the peanut protein curd. At rates of addition of sulfur dioxide greater than 0.15 pound of sulfur dioxide per 100 lbs. of meal (1500 pounds of water), the protein curd was more dense and settled more rapidly than for lesser rates of addition. Table 1 is more readily interpreted, and its significance understood, by referring to the graph shown in Figure 3 of the publication in the Journal of the American Oil Chemist's Society. Table 1 illustrates that the 0.230 rate of addition of SO₂, and immediate vicinity, is far superior in the production of a dense, rapidly settling curd than the lower rates. The preferred range 0.180 to 0.230 is the interpretation of this data. The temperature of the alkaline solution containing the peanut protein during precipitation of the protein also affects the density and type of protein curd formed as is shown in Table 2. This effect is shown as a function of the rate of the settling curd which is directly proportional to density of the curd.

The solubility of the protein at its isoelectric point, that is, at the pH of solution where the maximum amount protein precipitates, is shown as a function of the temperature of the alkaline solution during precipitation in Table 3.

Table 3.—*Effect of temperature on protein solubility at the isoelectric point*

| Temperature, °F. | Percentage of total nitrogen soluble |
|---|---|
| 73 | 7.6 |
| 82 | 8.0 |
| 91 | 8.5 |
| 120 | 11.6 |
| 150 | 15.3 |

The data of Tables 2 and 3 are shown in graphic form in Figures 4 and 5 of the said publication in J. A. O. C. S. In Table 3 of the instant specification the protein solubility at the isoelectric point 4.5 is shown to increase with increasing temperature. The protein remaining in solution at the isoelectric point is not recovered as protein by the novel conditions defining our preferred process. Consequently, the preferred process defines the critical upper temperature limit as 90° F., to minimize the loss of this soluble protein. The lower temperature limit is set by the need to avoid decrease in density of curd. As stated in footnote (ᵇ) of Table 2, column — of this specification, at temperatures less than 70° F. the density of the curd decreases.

The significance of the discovery is that a heavy and dense peanut protein curd has been made and consequently the curd settles very rapidly. This means that (1) a much smaller quantity of the solution has to be handled in order that the protein may be physically isolated from the solution. Using this new process only about one-third of the volume of the solutions must be handled to recover the precipitated protein as compared to about 90 percent using processes of prior art; (2) the time required for settling the curd using this process is about one hour as compared with 10 to 14 hours using processes of prior art; and (3) a greater yield of protein is obtained per unit weight of meal due to the lower temperature at which the solution is maintained during the precipitation of the protein and the lower solubility of the protein under these conditions.

The new process, in its preferred form, may be characterized as one for preparing peanut protein curds having a protein solids content greater Table 2.—*Effect of temperature on protein curds* ᵃ

| Temperature, °F.ᵇ | | | | | | | |
|---|---|---|---|---|---|---|---|
| 73 | | 90 | | 120 | | 150 | |
| Time | Solids in curds | Time | Solids in curds | Time | Solids in curds | Time | Solids in curds |
| Minutes | Per cent | Minutes | Per cent | Minutes | Per cent | Minutes | Per cent |
| 0 | 2.59 | 0 | 3.26 | 0 | 2.90 | 0 | 3.80 |
| 3 | 2.96 | 14 | 5.93 | 3 | 3.54 | 5 | 3.84 |
| 6 | 3.36 | 17 | 7.56 | 7 | 5.32 | 15 | 3.92 |
| 15 | 6.73 | 20 | 8.71 | 10 | 6.73 | 27 | 4.02 |
| 24 | 9.99 | 26 | 10.11 | 15 | 8.85 | 41 | 4.13 |
| 32 | 11.74 | 31 | 10.95 | 23 | 10.55 | 52 | 4.26 |
| 43 | 13.70 | 43 | 12.63 | 35 | 12.35 | 90 | 4.69 |
| 67 | 17.27 | 63 | 14.73 | 43 | 13.43 | 106 | 4.97 |
| 138 | 22.96 | 113 | 18.11 | 50 | 13.95 | 114 | 5.17 |
| | | 157 | 20.40 | 70 | 15.35 | 130 | 5.57 |
| | | 198 | 22.50 | 225 | 20.75 | 270 | 6.92 |
| | | 223 | 22.82 | | | 365 | 7.33 |
| | | 299 | 23.71 | | | | |

In Table 2, ᵃ and ᵇ are as follows:
ᵃ Rate of addition of sulfur dioxide was 0.230 lb. SO₂/min./100 lb. meal.
ᵇ At temperatures less than 70° F. the rate of increase of solids in curds decreased from the maximum rates obtained at temperatures between 73° and 90°.

than about 12 percent and preferably in the range of about 12 to 15 percent, which curds settle out preferably in not more than 1 hour. It comprises dispersing peanut meal in aqueous alkaline medium, preferably aqueous sodium hydroxide or aqueous potassium hydroxide, the water being in the ratio of about 15 parts of water to 1 part meal, the alkalizing constituent being preferably substantially not more than sufficient to solubilize the peanut protein. The curd is precipitated by introducing sulfur dioxide at a preferred rate of not less than about 0.18 pound per minute per 100 pounds of peanut meal, the solution being preferably at 70 to 90° F. The preferred range for the rate of introduction of the sulfur dioxide is about 0.18 to 0.23 lb. per minute per 100 lbs. of peanut meal. Although sodium hydroxide is the preferred solubilizing or dispersing agent, other known alkaline peanut meal dispersing agents may be used, for example, sodium sulfite, but to less advantage.

Having thus described my invention, I claim:

1. A process of preparing peanut protein curds having a protein solids content greater than about 12% comprising dispersing peanut meal in aqueous alkaline alkali metal compound dispersing medium, the water being in about the ratio 15 parts of water to 1 part meal, the alkalizing constituent being substantially no more than sufficient to solubilize the peanut protein, and precipitating said curds by introducing sulfur dioxide at a rate of not less than about 0.18 pounds per minute per 100 pounds of peanut meal, the solution being at 70 to 90° F.

2. The process of claim 1 in which a protein curd having a solids content in the range of about 12 to 15% is settled out in not more than 1 hour, wherein the rate of introduction of sulfur dioxide is in the range of about 0.18 to 0.23 pound per minute per 100 pounds of peanut meal.

3. The process of claim 2 in which the alkali metal compound is sodium hydroxide.

4. A process of preparing a dense, heavy, protein curd having a relatively quick settling rate, comprising: preparing a water-peanut meal suspension in the weight ratio of 10 parts of water to 1 part of meal; adjusting the pH of the suspension to about 7.5 with sodium hydroxide to peptize the protein; removing the insoluble portion of the meal and washing it with water which increases the ratio to 15 parts of water to 1 part of meal; introducing gaseous sulfur dioxide until the pH of the solution is about 4.5, the temperature during the introduction being maintained at 73° to 90° F., the rate of introduction of the $SO_2$ gas being about 0.23 pound per minute per 100 pounds of peanut meal, and isolating the protein curd from the liquor by physical separation.

5. In a process of preparing a dense, heavy peanut protein curd having a relatively quick settling rate of not more than one hour, wherein sulfur dioxide gas is introduced into a dilute aqueous sodium hydroxide dispersion of peanut meal until the isoelectric point of the dispersed protein is attained; the improvement comprising introducing the sulfur dioxide gas at a rate of about 0.23 pound per minute per 100 pounds of peanut meal while the dispersion is at 73° to 90° F.

JETT C. ARTHUR, JR.

REFERENCES CITED

The following references are of record in the file of this patent:

Burnett et al., Ind. and Eng. Chem., 36:284–288, March 1944.

Fontaine et al., Ind. and Eng. Chem., 37:1232–1236, December 1945.

Burnett, Chem. and Eng. News, 24:478–480, February 25, 1946.

Arthur et al., J. Am. Oil. Chem. Soc., 25:398–400, November 1948.